(12) United States Patent
Yoshizaki et al.

(10) Patent No.: US 10,192,090 B2
(45) Date of Patent: Jan. 29, 2019

(54) INFORMATION PROCESSING DEVICE, IMAGE READING APPARATUS AND NON-TRANSITORY COMPUTER READABLE MEDIUM STORING PROGRAM FOR SCANNING BASED ON A CODE IMAGE

(71) Applicant: FUJI XEROX CO., LTD., Tokyo (JP)

(72) Inventors: Akane Yoshizaki, Yokohama (JP); Kunihiko Kobayashi, Yokohama (JP); Kazuhiro Oya, Yokohama (JP); Shigeru Okada, Yokohama (JP); Shintaro Adachi, Yokohama (JP); Hiroyuki Kishimoto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 146 days.

(21) Appl. No.: 15/258,542

(22) Filed: Sep. 7, 2016

(65) Prior Publication Data

US 2017/0277926 A1    Sep. 28, 2017

(30) Foreign Application Priority Data

Mar. 23, 2016  (JP) ................................ 2016-058586

(51) Int. Cl.
  *G06K 7/14*  (2006.01)
  *G06K 9/00*  (2006.01)
  *H04N 1/387*  (2006.01)
  *H04N 1/00*  (2006.01)

(52) U.S. Cl.
  CPC ......... *G06K 7/1447* (2013.01); *G06K 7/1417* (2013.01); *G06K 7/1443* (2013.01); *G06K 9/00* (2013.01); *H04N 1/00326* (2013.01); *H04N 1/00328* (2013.01); *H04N 1/00334* (2013.01); *H04N 1/3877* (2013.01)

(58) Field of Classification Search
  CPC .. G06K 7/1417; G06K 7/1439; G06K 7/1447; G06K 7/1452; G06K 7/1443; H04N 1/3877; H04N 1/00326; H04N 1/00328; H04N 1/00334; H04N 1/00363
  See application file for complete search history.

(56) References Cited

U.S. PATENT DOCUMENTS

| | | | |
|---|---|---|---|
| 7,889,397 B2 * | 2/2011 | Shimasaki | H04N 1/32133 358/3.28 |
| 8,146,818 B2 * | 4/2012 | Nakamura | G06K 7/1443 235/462.01 |
| 9,654,661 B1 * | 5/2017 | Okada | H04N 1/00374 |
| 2006/0082475 A1 | 4/2006 | Zhao et al. | |

FOREIGN PATENT DOCUMENTS

JP    2006-079615 A    3/2006

* cited by examiner

*Primary Examiner* — Suezu Ellis
(74) *Attorney, Agent, or Firm* — Oliff PLC

(57) ABSTRACT

An information processing device includes: a scanner that performs scanning of a read image of a document and detects a code image included in a scanned region, which is a region where the scanning is completed; and a setting unit that sets, based on the code image detected by the scanner, a scanning region when the scanner scans an unscanned region, in which the scanning by the scanner has not been performed yet.

10 Claims, 14 Drawing Sheets

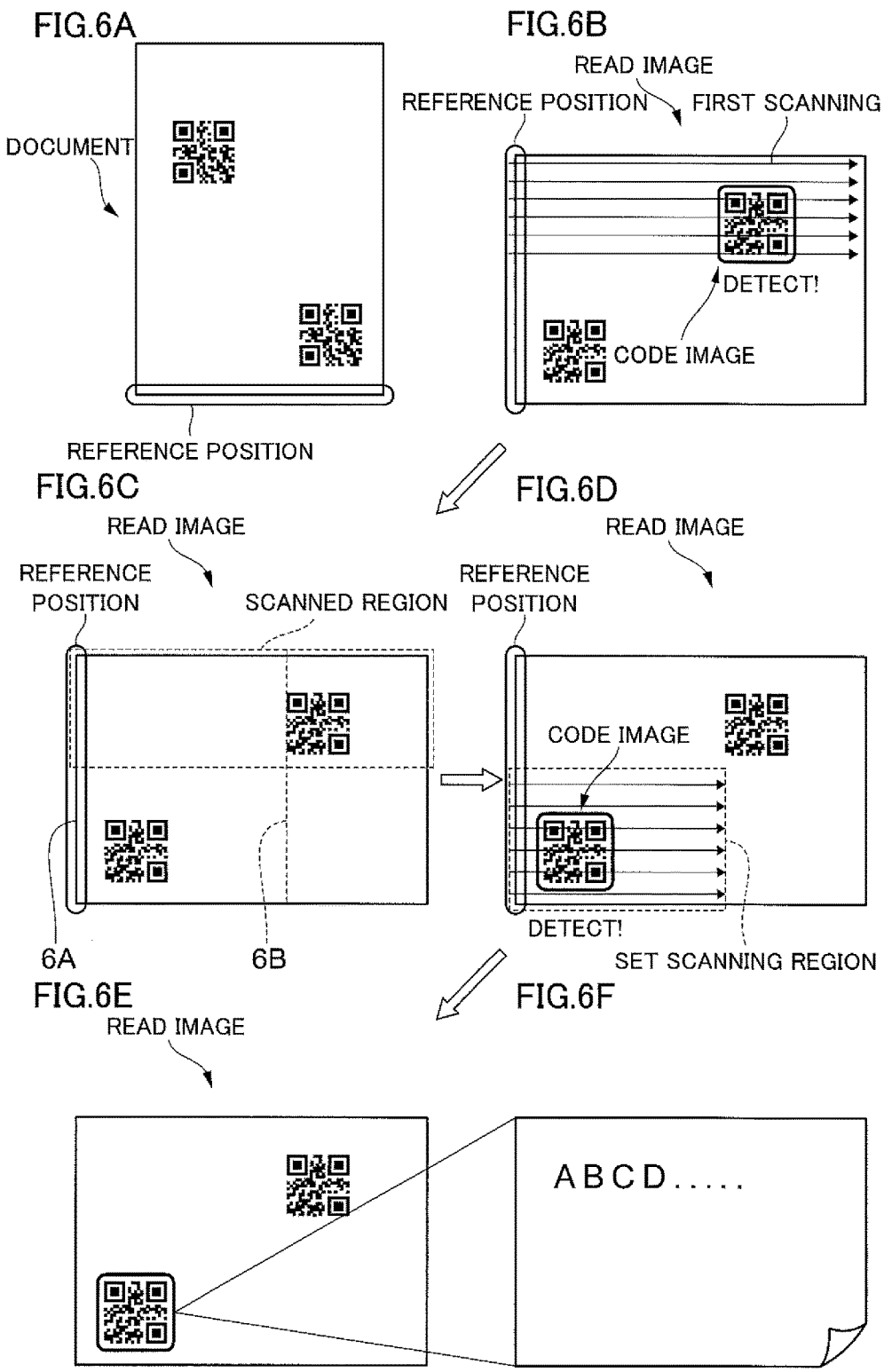

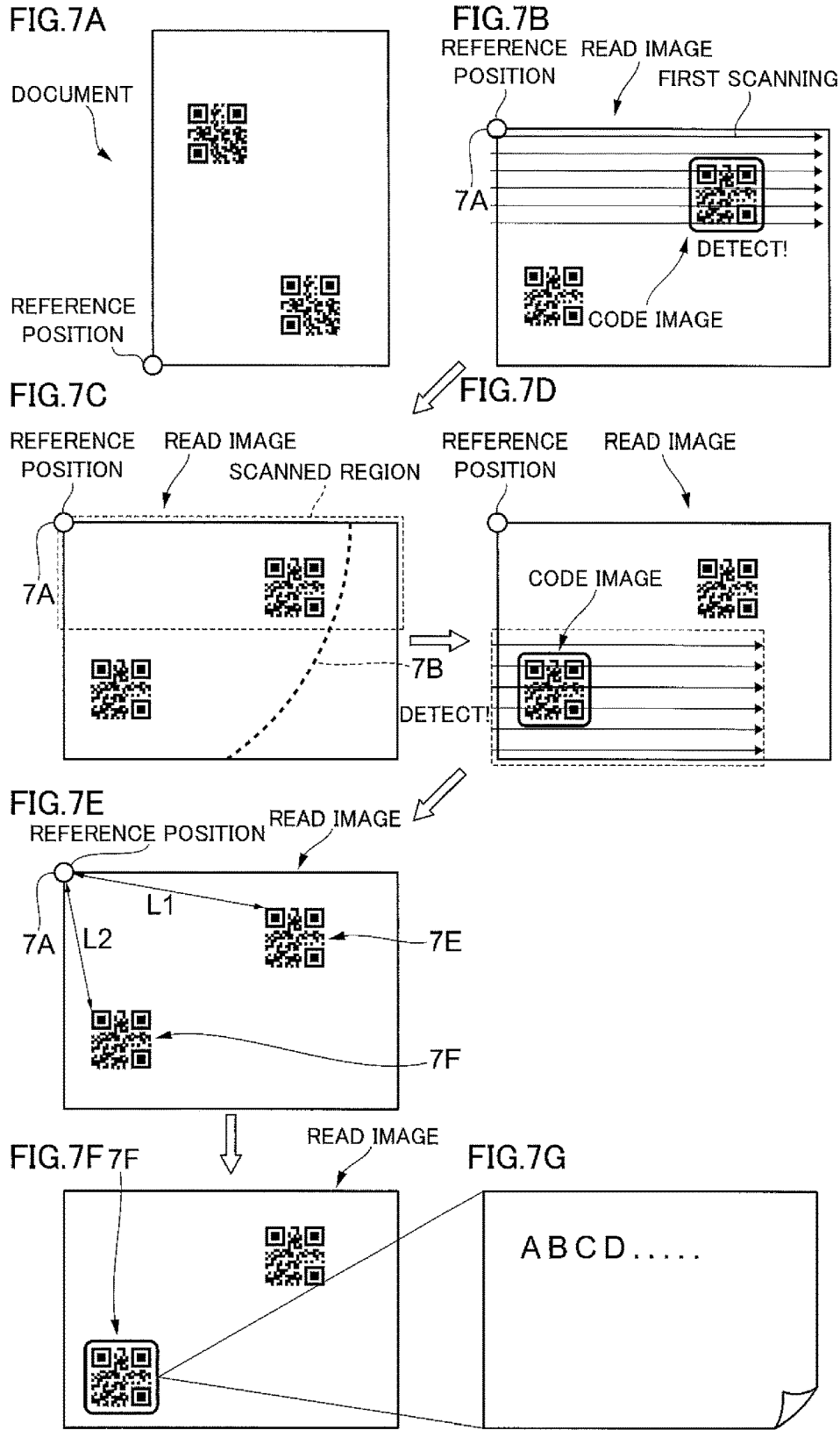

DOCUMENT
REFERENCE POSITION

READ IMAGE
REFERENCE POSITION
FIRST SCANNING
8A
DETECT!

REFERENCE POSITION
READ IMAGE
UNSCANNED REGION
8A 8C 8B

READ IMAGE
REFERENCE POSITION
SCANNING START POSITION
DETECT!
SECOND SCANNING

START POSITION OF THIRD SCANNING

READ IMAGE

A B C D . . . . .

INFORMATION PROCESSING DEVICE, IMAGE READING APPARATUS AND NON-TRANSITORY COMPUTER READABLE MEDIUM STORING PROGRAM FOR SCANNING BASED ON A CODE IMAGE

CROSS REFERENCE TO RELATED APPLICATION

This application is based on and claims priority under 35 USC § 119 from Japanese Patent Application No. 2016-058586 filed Mar. 23, 2016.

BACKGROUND

Technical Field

The present invention relates to an information processing device, an image reading apparatus and a non-transitory computer readable medium storing a program.

In recent years, techniques for adding a code image, such as a QR code, to a document on which image reading is performed have been suggested.

SUMMARY

According to an aspect of the present invention, there is provided an information processing device including: a scanner that performs scanning of a read image of a document and detects a code image included in a scanned region, which is a region where the scanning is completed; and a setting unit that sets, based on the code image detected by the scanner, a scanning region when the scanner scans an unscanned region, in which the scanning by the scanner has not been performed yet.

BRIEF DESCRIPTION OF THE DRAWINGS

An exemplary embodiment of the present invention will be described in detail based on the following figures, wherein:

FIGS. 6A to 6F are diagrams showing still another processing example of detecting the code image;

FIGS. 7A to 7G are diagrams showing still another processing example of detecting the code image;

DETAILED DESCRIPTION

Hereinafter, an exemplary embodiment according to the present invention will be described in detail with reference to attached drawings.

Figure 1:
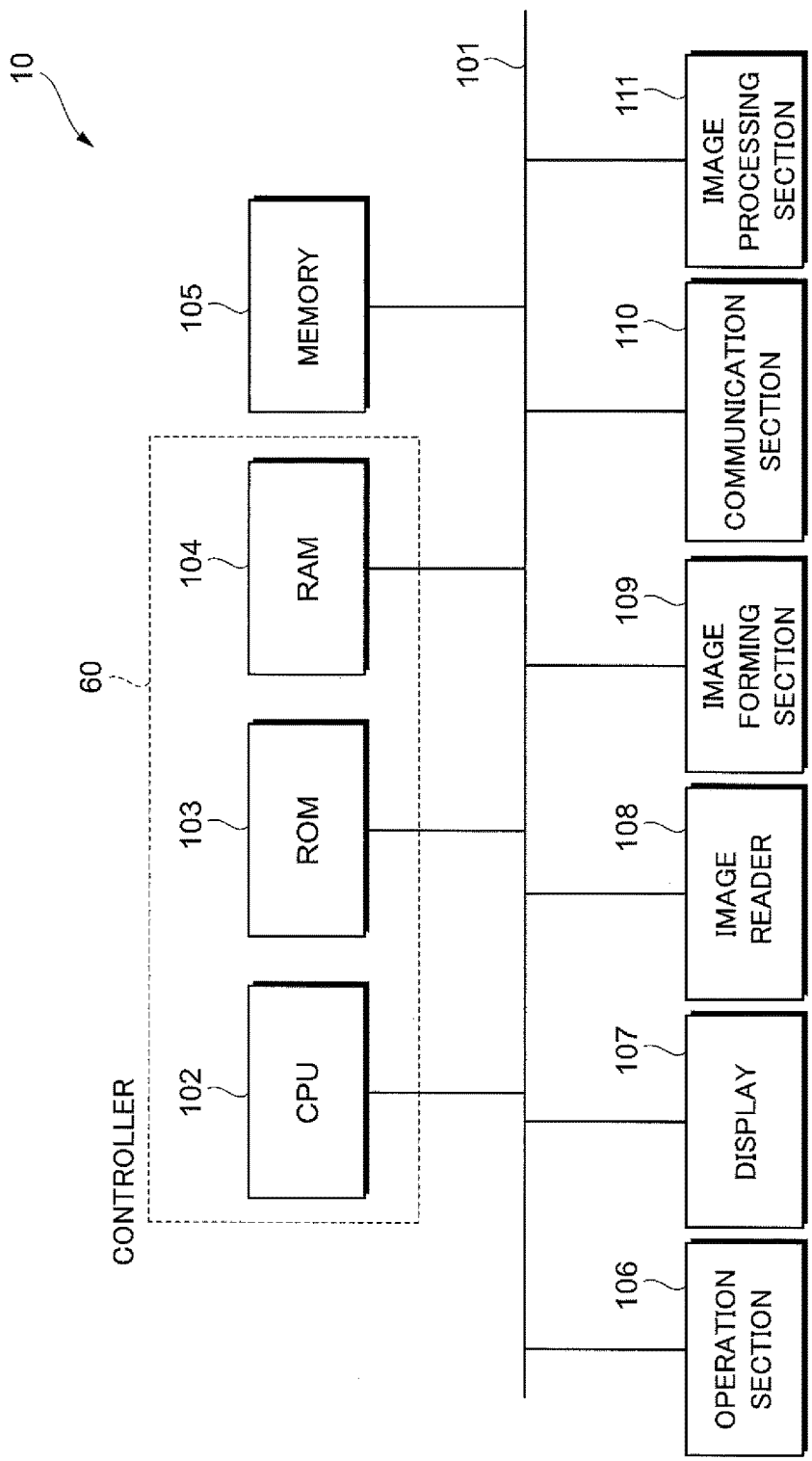
FIG. 1 is a diagram showing an image forming apparatus.

FIG. 1 is a diagram showing an image forming apparatus 10 according to the exemplary embodiment.

As shown in FIG. 1, each functional section constituting the image forming apparatus 10 is connected to a bus 101, and performs data transmission and reception via the bus 101.

An operation section 106 receives operations by a user. The operation section 106 is configured with, for example, hardware keys. Moreover, the operation section 106 is configured with, for example, a touch panel that outputs a control signal in response to a pressed position.

A display 107 is configured with, for example, a liquid crystal display, and displays data related to the image forming apparatus 10 under the control of a CPU 102. Moreover, the display 107 displays a menu screen referenced by a user when the user operates the image forming apparatus 10.

An image reader 108 as an example of an image reader is configured with a so-called scanning device and reads an image on a document having been set, to thereby create a read image of the document (image data).

An image forming section 109 forms a toner image corresponding to the image data onto a sheet, by use of, for example, an electrophotographic system. Note that, in the image forming section 109, image formation can be performed by use of other methods, such as an ink-jet head method.

A communication section 110 is connected to a communication line (not shown in the figure) and functions as a communication interface that performs communication with other devices connected to the communication line.

An image processing section 111 applies image processing, such as color correction or tone correction, to an image represented by image data.

A memory 105 is configured with a storing device, such as a hard disk device, and stores, for example, image data received by the communication section 110 or a read image (image data) created by the image reader 108.

A controller 60 controls each section of the image forming apparatus 10. The controller 60 is configured with a CPU (Central Processing Unit) 102, a ROM (Read Only Memory) 103 and a RAM (Random Access Memory) 104.

The ROM 103 stores a control program executed by the CPU 102. The CPU 102 reads the control program stored in the ROM 103 and executes the control program using the RAM 104 as a work area.

When the control program is executed by the CPU 102, each section of the image forming apparatus 10 is controlled by the CPU 102, and thereby the image forming apparatus 10 performs image formation onto a sheet or reading an image on a document to create a read image of the document.

Figure 2:
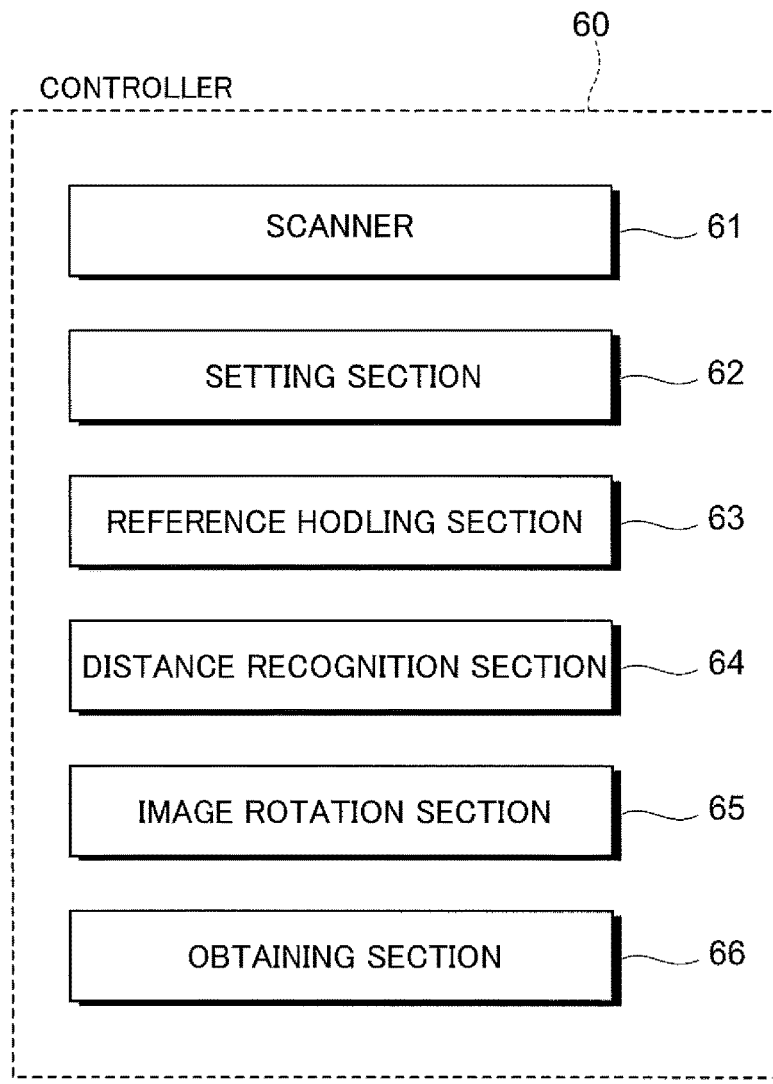
FIG. 2 is a block diagram showing a functional configuration of a controller.
Figure 3:
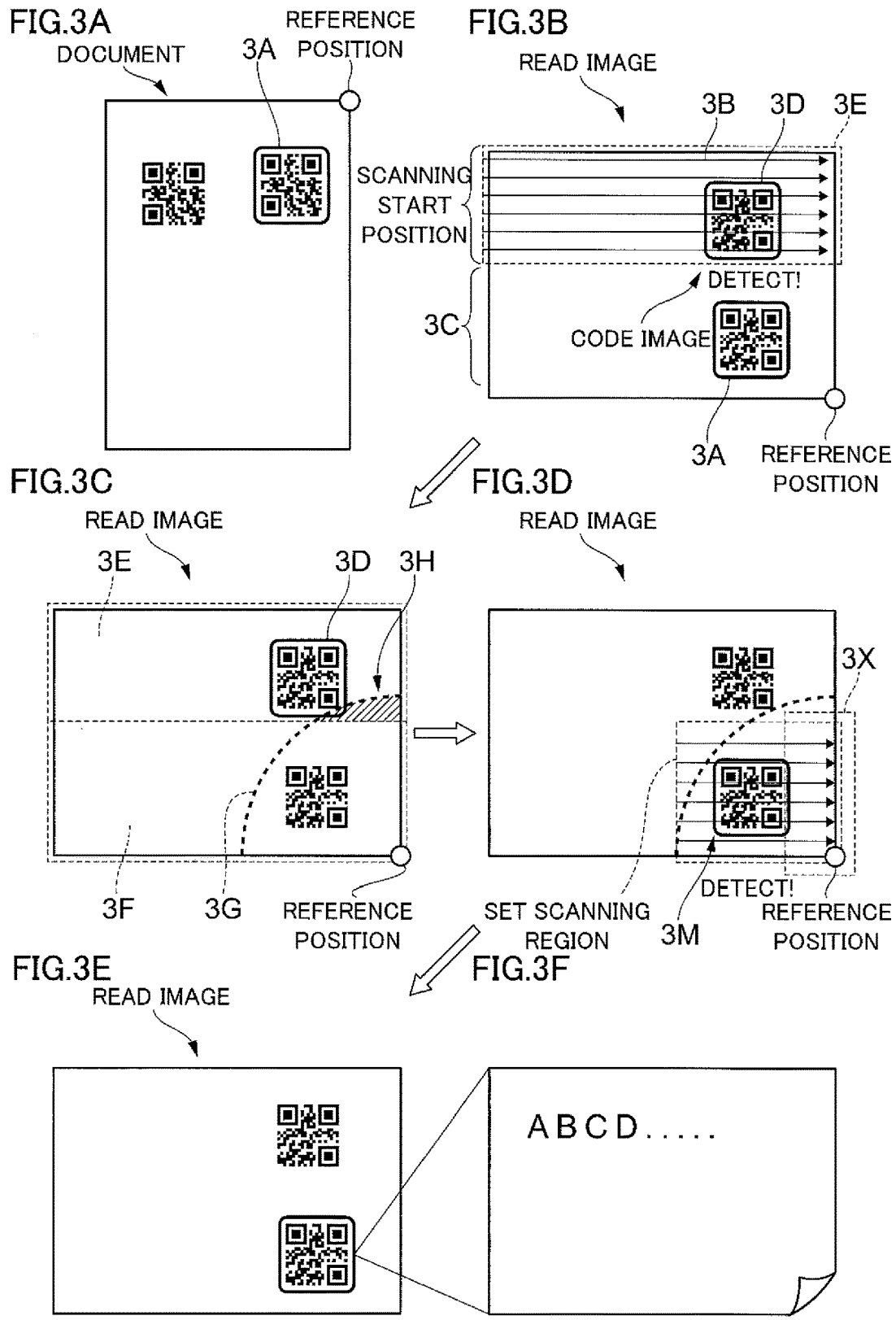
FIGS. 3A to 3F are diagrams showing specific examples of processes performed in the exemplary embodiment.

Moreover, in the exemplary embodiment, due to execution of the control program by the CPU 102, the controller 60 functions as a scanner 61, a setting section 62, a reference holding section 63, a distance recognition section 64, an image rotation section 65 and an obtaining section 66 as shown in FIG. 2 (a diagram showing a functional configuration of the controller 60). Note that, in FIG. 2, only the functional blocks related to reading of the code image (to be described later) are shown.

Here, in the exemplary embodiment, a portion where the scanner 61, the setting section 62, the reference holding section 63, the distance recognition section 64, the image rotation section 65 and the obtaining section 66 are provided can be grasped as an information processing device that performs processes related to the read image of the document.

Moreover, a portion of the image reader 108 (refer to FIG. 1) and the controller 60 can be grasped as an image reading apparatus that performs reading of a document and process for a read image of the document.

The scanner 61, the setting section 62, the distance recognition section 64, the image rotation section 65 and the obtaining section 66 are implemented by cooperation of software and hardware resources.

Specifically, in the exemplary embodiment, an operation system, application software executed in cooperation with the operation system, and so forth are stored in the ROM 103 (refer to FIG. 1) or the memory 105. Then, in the exemplary embodiment, the CPU 102 reads these programs from the ROM 103 or the like into the RAM 104, which is a main storage device, and executes thereof, and accordingly, each of the functional sections, the scanner 61, the setting section 62, the distance recognition section 64, the image rotation section 65 and the obtaining section 66, is implemented.

Moreover, the reference holding section 63 is implemented by the ROM 103, the memory 105, or the like.

Here, the program executed by the CPU 102 can be provided to the image forming apparatus 10 in a state being stored in a recording medium readable by a computer, such as a magnetic recording medium (a magnetic tape, a magnetic disk or the like), an optical recording medium (an optical disk or the like), a magneto-optical recording medium or a semiconductor memory.

Moreover, the program executed by the CPU 102 may be downloaded to the image forming apparatus 10 by use of a communication tool, such as the Internet.

In the process of the exemplary embodiment, a code image included in a read image of a document (a read image obtained by the image reader 108 (refer to FIG. 1)) is detected.

Then, the obtaining section 66 as an example of an obtaining unit performs decoding of the detected code image, to thereby obtain information stored in the code image.

Thereafter, in the image forming apparatus 10, predetermined processes are performed based on the obtained information.

For example, if the information stored in the code image is information indicating a destination of the information, for example, a read image of the document is transmitted to the destination.

Moreover, for example, if the information stored in the code image is information indicating a file name, the file name is associated with the read image of the document.

Moreover, in the exemplary embodiment, a reference position used for determining which code image is provided with priority among the code images included in the read image is designated by a user in advance.

Specifically, the operation section 106 (refer to FIG. 1) is operated by a user, and thereby the reference position is designated by the user. Then, in the exemplary embodiment, based on information obtained from a code image closest to the reference position, a predetermined process, such as the above-described transmission process, is executed.

Note that the reference position designated by the user is held by the reference holding section 63, and in the exemplary embodiment, the reference position designated by the user is recognized by reference to the information held by the reference holding section 63.

More specifically, in some cases, plural code images are included in the read image of the document, and in such cases, in the absence of reference as to which code image is provided with priority, there is a possibility of being incapable of selecting a code image used for transmission of information or the like.

Therefore, in the exemplary embodiment, the reference position is designated in advance by the user as described above. Then, based on information obtained from a code image closest to the reference position, a predetermined process, such as a transmission process, is executed.

FIGS. 3A to 3F are diagrams showing specific examples of processes performed in the exemplary embodiment.

FIG. 3A is a diagram illustrating a reference position designated by a user.

In the specific example shown in FIG. 3A, an upper right corner portion of a document in an erected state is designated by a user, and accordingly, the upper right corner position becomes the reference position. Then, in this case, based on information obtained from a code image indicated by the sign 3A in the figure, which is closest to the reference position, a predetermined process, such as transmission of information, is executed.

Note that, in the exemplary embodiment, description is given of a case of using a QR code (Registered Trademark in Japan), which is a two-dimensional code, as the code image as an example; however, code images of other kinds may also be used.

Here, when the document is to be read, there are some cases in which the document is not in the erected state, but is set in a lying state and the read image is obtained. FIG. 3B shows a read image obtained from a document in a lying state.

In such a case, the reference position is moved; in this specific example, the reference position is located in the lower right in the figure. Then, in this case, the code image closest to the reference position (the code image indicated by a sign 3A) is also moved to the lower right in the figure.

Arrows 3B shown in FIG. 3B indicate scanning performed on the read image in the lying state.

In the exemplary embodiment, by the scanner 61, as an example of a scanner, scanning of the read image is performed from a predetermined scanning start position. Specifically, in the exemplary embodiment, the upper left in the figure is the scanning start position, and the first scanning is performed from the scanning start position toward the right direction.

When the first scanning is finished, a scanning location is shifted to a lower side in the figure, and the second scanning is performed from the portion indicate by a sign 3C in the figure.

In the specific example shown in FIG. 3B, by the first scanning, a code image indicated by a sign 3D is detected. Specifically, the scanner 61 of the exemplary embodiment performs the first scanning, and if a code image is included in a scanned region, which is a region that has been subjected to scanning, detects the code image. More specifically, in FIG. 3B, the region enclosed by a sign 3E indicates the scanned region, and the scanner 61 detects the code image from the scanned region.

Thereafter, the setting section 62, as an example of a setting unit, analyzes the code image detected from the scanned region, to thereby recognize an orientation of the read image.

Figure 4:
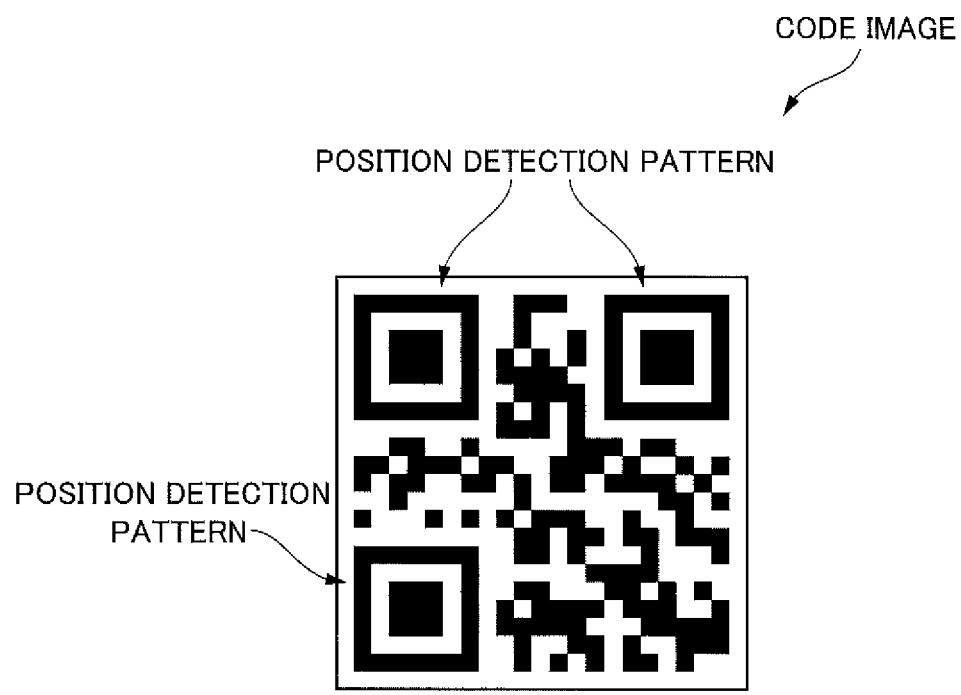
FIG. 4 is a diagram showing details of a code image.

In a code image, as shown in FIG. 4 (a diagram showing details of a code image), a position detection pattern is provided in each of three corners, and the setting section 62 recognizes the orientation of the read image based on the position detection patterns.

Specifically, when a code image is formed in a document in an erected state, normally, the code image is formed to have the position detection patterns positioned at three points, the upper left, the upper right and the lower left. The setting section 62 recognizes the orientation of the read image based on the positions of the three position detection patterns.

In the specific example shown in FIG. 3B, of the three position detection patterns included in the detected code image (the code image indicated by the sign 3D), two patterns are positioned at the upper right and the lower right in the figure, and the other one is positioned at the upper left in the figure; in this case, the setting section 62 recognizes that the read image is rotated 90° in the clockwise direction.

Further, the setting section 62 recognizes the reference position designated by the user based on the recognized rotation angle. More specifically, when the read image is rotated, the reference position designated by the user is moved, and therefore, the setting section 62 recognizes the reference position after moving based on the above rotation angle that has been recognized. In this specific example, the setting section 62 recognizes that the reference position is present at the lower right corner portion in FIG. 3B.

Thereafter, the setting section 62 narrows the scanning region. In other words, the setting section 62 sets a scanning region when the scanner 61 scans an unscanned region where scanning by the scanner 61 has not yet been performed.

Here, the region indicated by a sign 3F in FIG. 3C is the unscanned region where scanning by the scanner 61 has not been performed. In performing the second scanning, the scanner 61 of the exemplary embodiment performs scanning of the scanning region within the unscanned region 3F, the scanning region being set by the setting section 62. In other words, in performing the second scanning, the scanner 61 scans a part of the unscanned region.

Note that the region indicated by the sign 3E in FIG. 3C shows a scanned region where scanning has already been performed.

The setting section 62 sets a scanning region within the unscanned region 3F. Specifically, the setting section 62 sets a region closer to the reference position than a broken line 3G in FIG. 3C as the scanning region.

More specifically, the setting section 62 sets a region closer to the reference position than an arc around the reference position as the scanning region, the arc passing through a corner portion (a corner portion closest to the reference position) of the code image that has already been detected by the scanning section 61 (the code image indicated by the sign 3D).

To additionally describe, the setting section 62 sets a region closer to the reference position than a code image that has already been detected by the scanning section 61 as the scanning region. To be described further, the setting section 62 sets a fan-shaped region positioned closer to the reference position than a code image that has already been detected by the scanning section 61 as the scanning region.

Further, the setting section 62 determines whether any scanned region is included in the scanning region that has been set, and if any scanned region is included, the setting section 62 sets a region, from which the scanned region is eliminated, as a new scanning region.

In the exemplary embodiment, in the location indicated by a sign 3H in FIG. 3C, the scanning region having been set and the scanned region overlap each other, and a part of the scanned region is included in the scanning region that has been set. The setting section 62 sets the region, from which the part is eliminated, as a new scanning region.

In the exemplary embodiment, as described above, if there are plural code images, a predetermined process, such as information transmission, is executed based on information obtained from a code image closest to the reference position.

In such a case, a code image positioned on a far side from the reference position than the code image that has already been detected is irrelevant to the process. On the other hand, there is a possibility that a code image further exists on a side closer to the reference position than the code image that has already been detected.

Therefore, in the exemplary embodiment, the setting section 62 sets a region on a side closer to the reference position than a code image that has already been detected as the scanning region as described above.

To additionally describe, the setting section 62 sets a region that is a part of an unscanned region and is at least positioned on a side within the unscanned region closer to the reference position as the scanning region.

Note that, hereinafter in the specification, the scanning region set by the setting section 62 is referred to as "set scanning region" in some cases.

FIG. 3D is a diagram showing scanning on the set scanning region by the scanner 61.

In the exemplary embodiment, when the scanning region is set by the setting section 62, the scanner 61 performs scanning on the scanning region (the set scanning region). Note that, in the exemplary embodiment, the setting section 62 sets a fan-shaped region as a set scanning region as described above; however, in actual scanning, for simplifying the scanning process, the scanner 61 scans a rectangular region including the fan-shaped region as shown in FIG. 3D.

Here, in this processing example, a code image (the code image indicated by a sign 3M) is included in the rectangular region, and the scanner 61 detects the code image. In this processing example, the code image detected from the rectangular region becomes the code image closest to the reference position.

Thereafter, the obtaining section 66 performs a decoding process on the code image (the code image closest to the reference position), to thereby obtain information included in the code image, as shown in FIGS. 3E and 3F. Then, as described above, a predetermined process, such as information transmission, is executed based on the obtained information.

In the process of the exemplary embodiment, it is possible to detect a code image that is closest to the reference position without performing scanning of a whole surface of a read image. In such a case, the code image can be detected more speedily as compared to a case in which a whole surface of a read image is scanned to detect a code image.

FIGS. 5A to 5F are diagrams showing another processing example of detecting the code image.

Figure 5A:
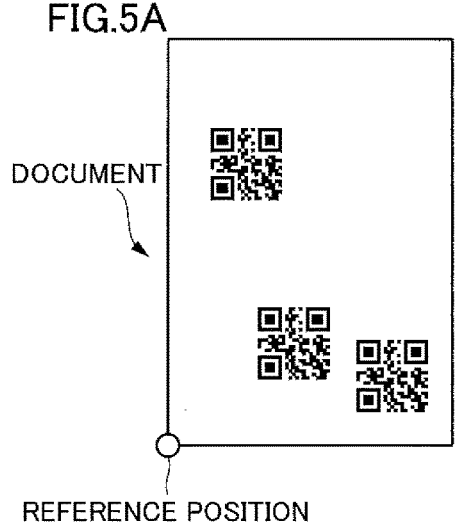
FIGS. 5A to 5F are diagrams showing another processing example of detecting the code image.

In this processing example, as shown in FIG. 5A, a lower left corner portion in the figure is set as the reference position by the user. Moreover, in this processing example, as shown in FIG. 5B, scanning of a read image in a lying state is performed.

Figure 5B:
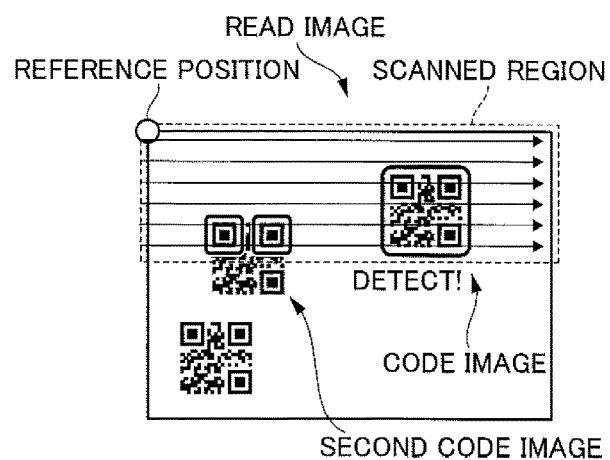
Figure 5C:
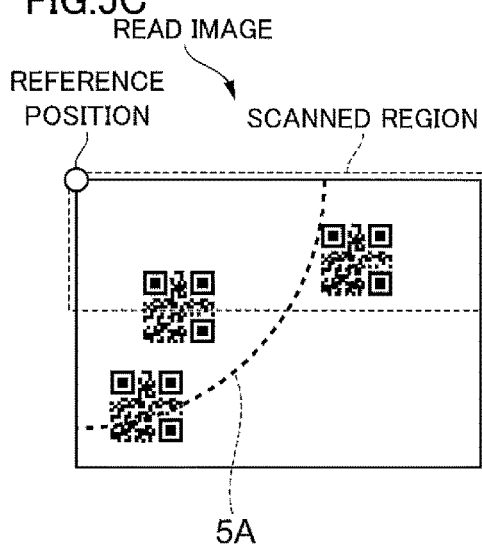

In this processing example, also, as shown in FIG. 5B, a code image is detected by the first scanning. Then, similar to the above, the setting section 62 analyzes the code and recognizes that the read image is rotated 90° in the clockwise direction. Then, the setting section 62 recognizes that the upper left corner portion in FIG. 5C is the reference position.

Moreover, in this processing example, as shown in FIG. 5B, a part of the second code image is included in the region where the first scanning is performed (the scanned region), and, in the first scanning, the part of the second code image is detected by the scanner 61.

Then, the scanner 61 holds information (information such as positional information) about the part of the detected second code image.

Thereafter, in the exemplary embodiment, the scanning region is set by a method similar to the above. Specifically, first, the setting section 62 sets a side closer to the reference position than a broken line 5A in FIG. 5C as the scanning region.

Further, the setting section 62 determines whether any scanned region is included in the scanning region that has been set, and if any scanned region is included, the setting section sets a region, from which the scanned region is eliminated, as a new scanning region.

In this processing example, a part of a scanned region is included within a region closer to the reference position than the broken line 5A (a fan-shaped region), and the setting section 62 sets the region, from which the part is eliminated, as a new scanning region.

Figure 5D:
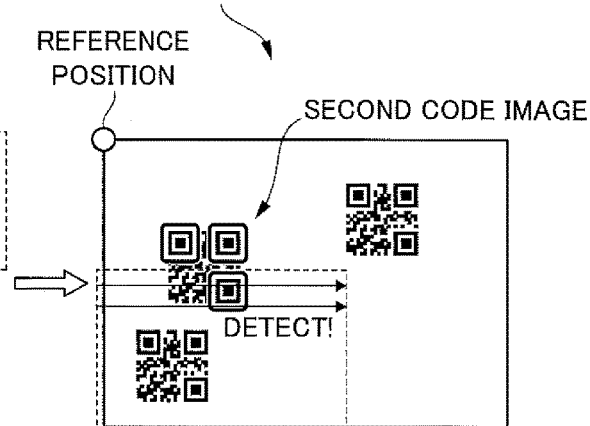

Next, as shown in FIG. 5D, the scanner 61 scans a region including the scanning region set by the setting section 62 (the set scanning region).

Consequently, in the exemplary embodiment, the scanner 61 detects another part of the second code image. Then, the scanner 61 detects the second code image based on information about the second code image detected by the first scanning and information about the second code image detected by the second scanning.

Here, in the process of the exemplary embodiment, there is a possibility that merely a part of the second code image is detected in the second scanning, to thereby result in that the second code image is undetected.

Therefore, in the exemplary embodiment, in consideration of, not only the information obtained by the second scanning, but also the information obtained by the first scanning (based on the information obtained by the first scanning and the information obtained by the second scanning), presence or absence of the code image is determined.

Figures 5E, 5F:
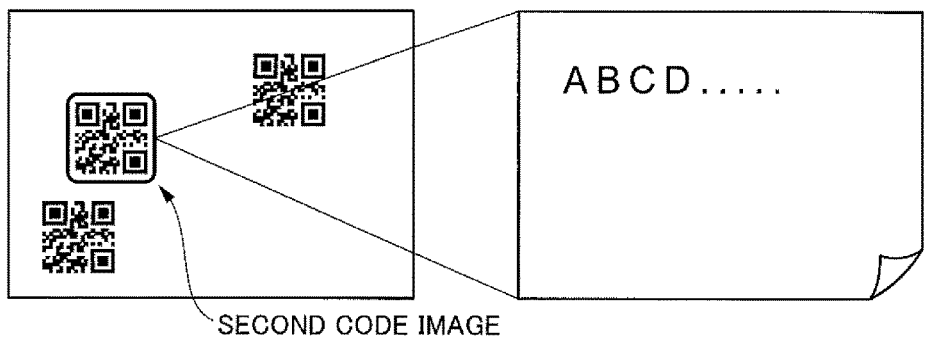

Note that the process after detecting the second code image is similar to the above, and, as shown in FIGS. 5E and 5F, the obtaining section 66 obtains the information included in the second code image, and a predetermined process, such as a transmission process of information, is executed based on the information.

FIGS. 6A to 6F are diagrams showing still another processing example of detecting the code image.

In this processing example, as shown in FIG. 6A, a lower side of the document is set as the reference position by the user.

In the above, a point, such as a corner portion, is the reference position; however, in this processing example, a side extending along one direction is set as the reference position. Moreover, in this process, similar to the above and as shown in FIG. 6B, scanning of a read image in a lying state is performed.

In this specific example, also, as shown in FIG. 6B, a code image is detected by the first scanning. Consequently, it is recognized that the read image is rotated 90° in the clockwise direction, and a side positioned on the left side in FIG. 6C (the side indicated by a sign 6A) is recognized as the reference position.

Thereafter, the setting section 62 sets a scanning region. Specifically, in FIG. 6C, the setting section 62 sets a side closer to the reference position than a broken line indicated by a sign 6B as the scanning region. Moreover, similar to the above, the setting section 62 determines whether any scanned region is included in the scanning region that has been set, and if any scanned region is included, the setting section sets a region, from which the scanned region is eliminated, as a new scanning region.

In this processing example, a part of a scanned region is included within a region closer to the reference position than the broken line indicated by the sign 6B (a rectangular region), and the setting section 62 sets the region, from which the part is eliminated, as a scanning region.

Next, as shown in FIG. 6D, the scanner 61 scans the scanning region having been set (the set scanning region).

In this processing example, a code image is included in the set scanning region, and the code image is detected. Then, similar to the above, decoding of the code image is performed, and as shown in FIGS. 6E and 6F, information stored in the code image is obtained, then, subsequently, a predetermined process, such as information transmission, is executed based on the information.

FIGS. 7A to 7G are diagrams showing still another processing example of detecting the code image.

In this processing example, as shown in FIG. 7A, a lower left corner portion is set as the reference position by the user. Moreover, in this processing example, similar to the above and as shown in FIG. 7B, scanning of a read image in a lying state is performed.

In this specific example, also, as shown in FIG. 7B, a code image is detected by the first scanning. Consequently, the setting section 62 recognizes that the read image is rotated 90° in the clockwise direction, and further, recognizes a corner portion positioned at the upper left in FIGS. 7B and 7C (the corner portion indicated by a sign 7A) as the reference position.

Thereafter, in the processing example, the setting section 62 sets a side closer to the reference position than an arc indicated by a broken line 7B in FIG. 7C as the scanning region.

Specifically, the setting section 62 sets a side closer to the reference position than an arc around the reference position as the scanning region, the arc passing through a side farther from the reference position than the code image detected by the first scanning.

In the specific example shown in FIG. 3C, a side closer to the reference position than an arc passing through a corner portion, of plural corner portions in a code image, positioned at a location closest to the reference position is set as the scanning region; however, in the processing example shown in FIG. 7C, a side closer to the reference position than an arc passing through a location farther from the reference position than a corner portion, of plural corner portions in a code image, positioned at a location farthest from the reference position is set as the scanning region.

Note that, also in the specific example shown in FIG. 7C, a scanned region is included within a region positioned inside of the arc, and the setting section 62 sets the region, from which the scanned region is eliminated, as a new scanning region.

Thereafter, as shown in FIG. 7D, the scanner 61 scans the scanning region set by the setting section 62 (the set scanning region). In this set scanned region, a code image is included, and the code image is detected.

Thereafter, in the exemplary embodiment, the distance recognition section 64 recognizes a distance L1 between the first code image (the code image indicated by a sign 7E in FIG. 7E, which is the code image detected from the scanned region) and the reference position. Moreover, the distance recognition section 64 recognizes a distance L2 between the second code image (the code image indicated by a sign 7F in FIG. 7E, which is the code image detected from the set scanning region) and the reference position.

Then, the setting section 62 recognizes a code image closer to the reference position based on the distance L1 and the distance L2. In the processing example, the distance L2 is smaller than the distance L1, and accordingly, the setting section 62 recognizes the code image indicated by the sign 7F as a code image closer to the reference position. Then, the obtaining section 66 as an example of an obtaining unit performs decoding of the code image indicated by the sign 7F, to thereby obtain information included in the code image indicated by the sign 7F as shown in FIGS. 7F and 7G. Then, similar to the above, a predetermined process, such as a transmission process of information, is executed based on the information.

The size of the set scanning region set by the setting section 62 is capable of being changed based on a parameter or the like inputted by the user; in the processing example, as described above, the scanning region is set such that a region positioned at a side farther from the reference position than the detected code image is included.

In this case, the second detected code image (the code image detected from the set scanning region) is possibly positioned at a farther side from the reference position than the first detected code image (the code image detected from the scanned region).

Therefore, in the exemplary embodiment, as described above, distance between each code image and the reference position is recognized, and thereby, a code image closer to the reference position is recognized. Then, information stored in the closer code image is obtained, and accordingly, a predetermined process is executed based on the information.

FIGS. 8A to 8F are diagrams showing still another processing example of detecting the code image.

Figure 8A:
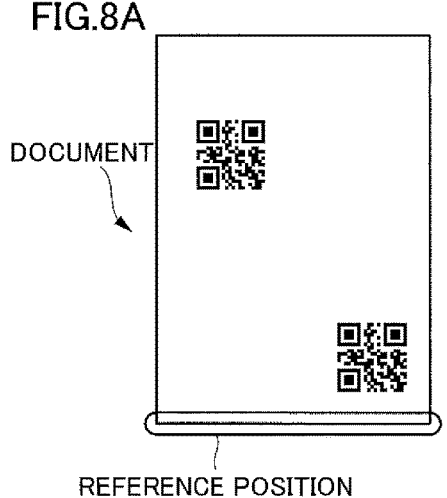
FIGS. 8A to 8F are diagrams showing still another processing example of detecting the code image.

In this processing example, as shown in FIG. 8A, a lower side of the document is set as the reference position by the user. Moreover, in this processing example, similar to the above and as shown in FIG. 8B, scanning of a read image in a lying state is performed.

Figure 8B:
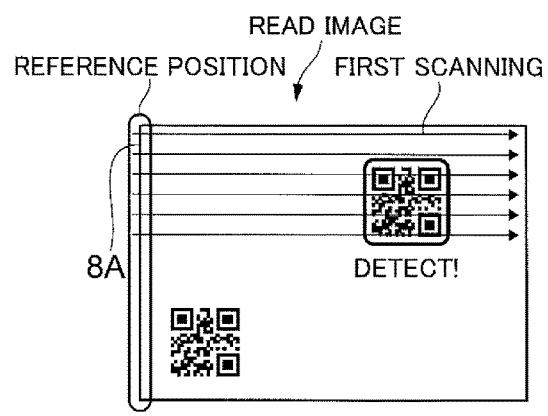

In this processing example, also, as shown in FIG. 8B, a code image is detected by the first scanning. Consequently, it is recognized that the read image is rotated 90° in the clockwise direction. Moreover, a side positioned on the left side in the figure in FIGS. 8B and 8C (the side indicated by a sign 8A) is recognized as the reference position.

Figure 8C:
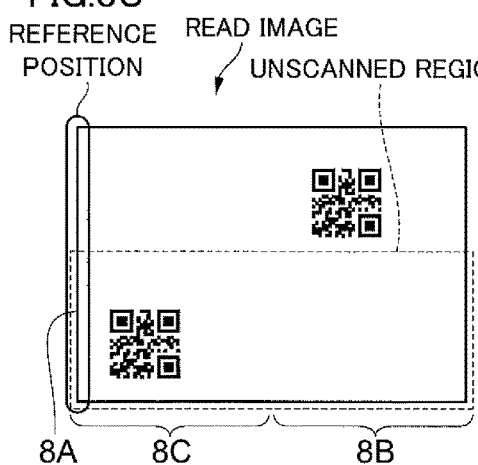
Figure 8D:
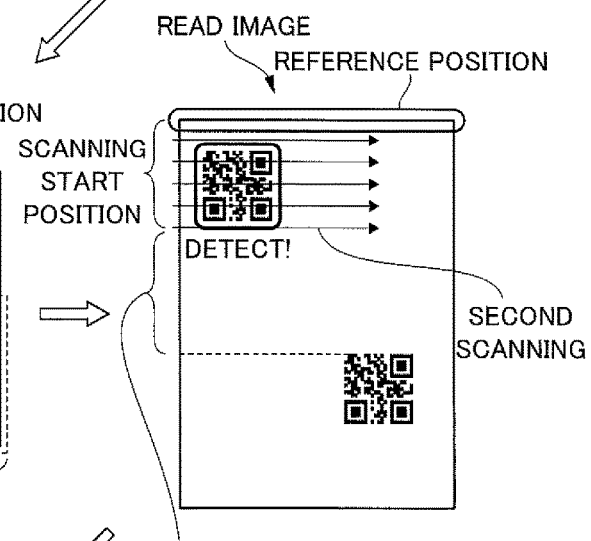

Thereafter, in the exemplary embodiment, as shown in FIGS. 8C and 8D, the image rotation section 65, as an example of a rotation unit, rotates the read image 900 in the clockwise direction.

To additionally describe, the image rotation section 65 rotates the read image such that a region within an unscanned region closer to the reference position (not the region indicated by a sign 8B, but the region indicated by a sign 8C in FIG. 8C) comes close to the scanning start position (refer to FIG. 8D).

Thereafter, in the processing example, the scanner 61 starts scanning of the unscanned region (the second scanning) as shown in FIG. 8D; however, in the exemplary embodiment, on this occasion, the scanning is started from a side of the reference position where a possibility of disposing a code image is high.

Consequently, if the second code image is provided in the unscanned region, the possibility of finding the second code image more speedily is increased.

Figure 8E:
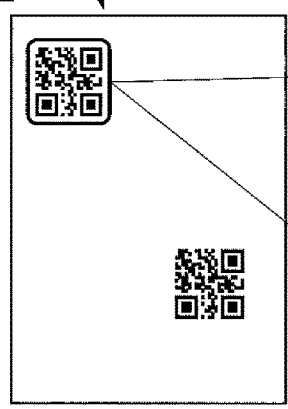
Figure 8F:
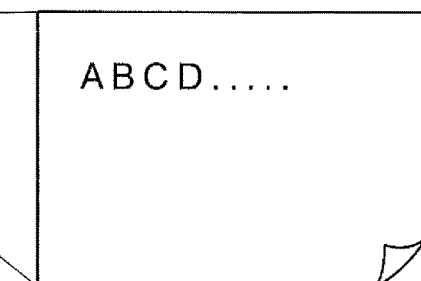

In the processing example, as shown in FIGS. 8A to 8F, a case in which the second code image is formed on a side closer to the reference position is exemplified, and the second code image is detected by the second scanning. Thereafter, as shown in FIGS. 8E and 8F, decoding of the second code image is performed, to thereby obtain information stored in the code image. Then, similar to the above, a predetermined process is executed.

Note that, if the code image is not detected by the second scanning, the scanning position is shifted downward in FIG. 8D, and the third and subsequent scanning will be performed.

Note that, in the above processing examples shown in FIGS. 3A to 8F, the description has been given of the case in which the reference position is designated by the user; however, the reference position may be fixed at one location, such as an upper right corner portion of the document or an upper side of the document, by default.

In this case, in setting a scanning region in an unscanned region, the setting section 62 sets the scanning region on a side closer to the one location.

Moreover, in the above, the scanning region is set based on the reference position; however, the setting of the scanning region may be performed not based on the reference position.

Specifically, after the orientation of the read image is recognized based on the code image, for example, a region positioned in the upper half or the lower half of the read image (and a scanned region is eliminated from the region) may be set as the scanning region. Moreover, for example, a region positioned at the upper right of the read image that covers ¼ of the total area of the read image (and a scanned region is eliminated from the region) may be set as the scanning region.

Figure 9:
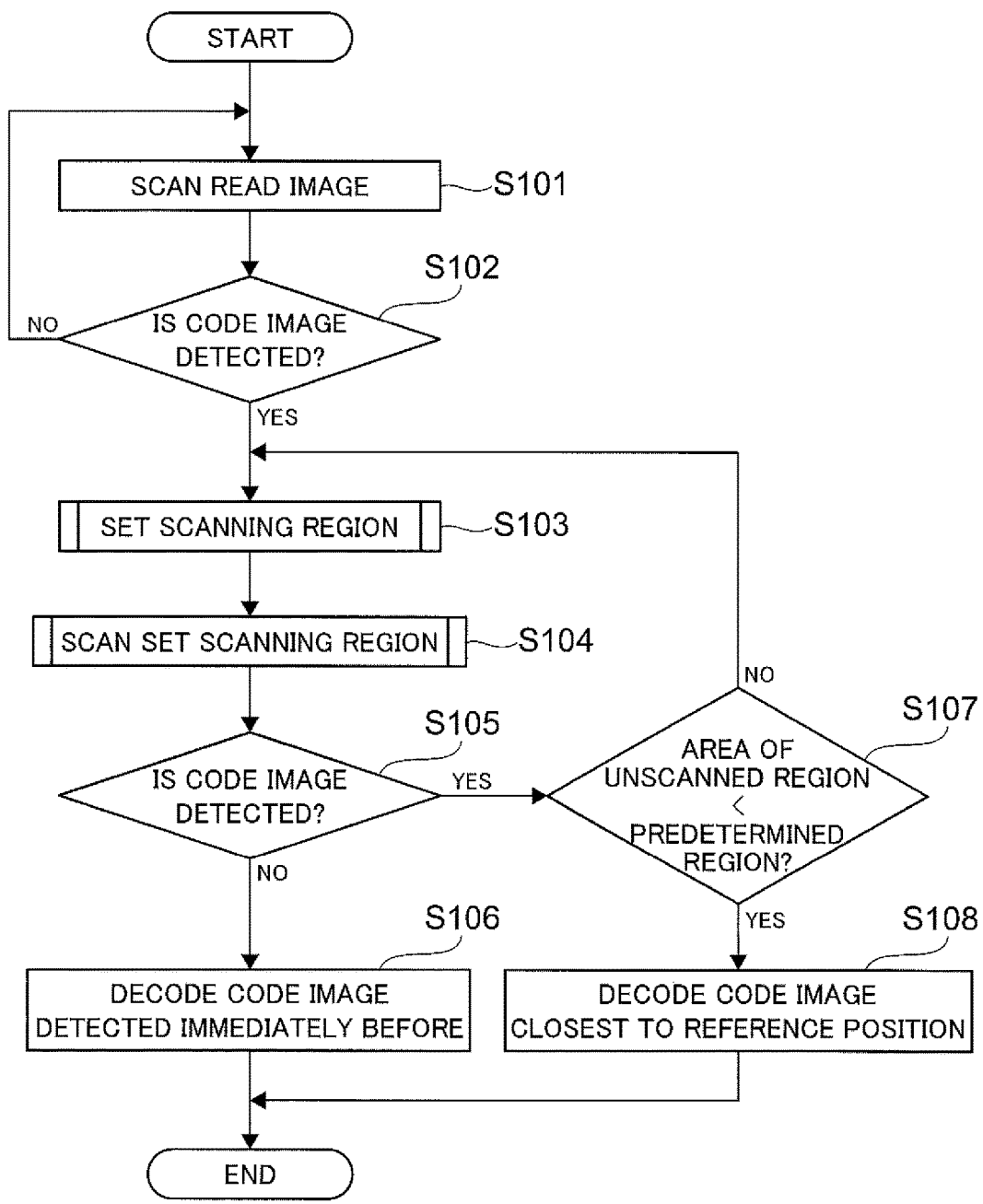
FIG. 9 is a flowchart showing a series of a flow of the processes shown in FIGS. 3A to 7G.

FIG. 9 is a flowchart showing a series of a flow of the processes shown in FIGS. 3A to 7G.

In the process of the exemplary embodiment, first, the scanner 61 starts scanning of a read image (step 101). More specifically, the scanner 61 starts scanning from a predetermined scanning start position. Then, in the course of sequentially performing the scanning, the scanner 61 determines whether or not a code image is detected (step 102). Then, in step 102, if it is not determined that the code image is detected, the process of step 101 is executed again.

On the other hand, if it is determined that the code image is detected in step 102, the setting section 62 sets a scanning region based on the detected code image (step 103).

Specifically, as described above, the setting section 62 recognizes the orientation of the read image based on the detected code image, and then recognizes a reference position based on the orientation. Then, based on the reference position, the scanning region is set.

Next, the scanner 61 performs scanning of the scanning region set in step 103 (the set scanning region) (step 104). Then, the scanner 61 determines whether or not a code image is detected (determines whether or not a code image exists in the set scanning region) (step 105).

Then, in step 105, if the scanner 61 determines that the code image is not detected, the obtaining section 66 performs decoding of the code image detected immediately before (in this case, the first code image) (step 106), to thereby obtain information stored in the code image. Thereafter, as described above, a predetermined process, such as a transmission process of information, is executed.

On the other hand, in step 105, if the scanner 61 determines that the code image is detected, the process proceeds to step 107 and the scanner 61 determines whether or not an area of an unscanned region is smaller than a predetermined area (for example, an area of a code image) (step 107), then, if the area of the unscanned region is larger than the predetermined area, the processes of step 103 and subsequent steps are executed again (scanning is further performed).

On the other hand, in step 107, if it is determined that the area of the unscanned region is smaller than the predetermined area, the distance recognition section 64 recognizes a distance between each of the detected code images and the reference position. Then, the distance recognition section 64 recognizes the code image closest to the reference position. Thereafter, the obtaining section 66 performs decoding of the code image closest to the reference position (step 108), to thereby obtain information stored in the code image. Thereafter, a predetermined process, such as a transmission process of information, is executed.

Figure 10:
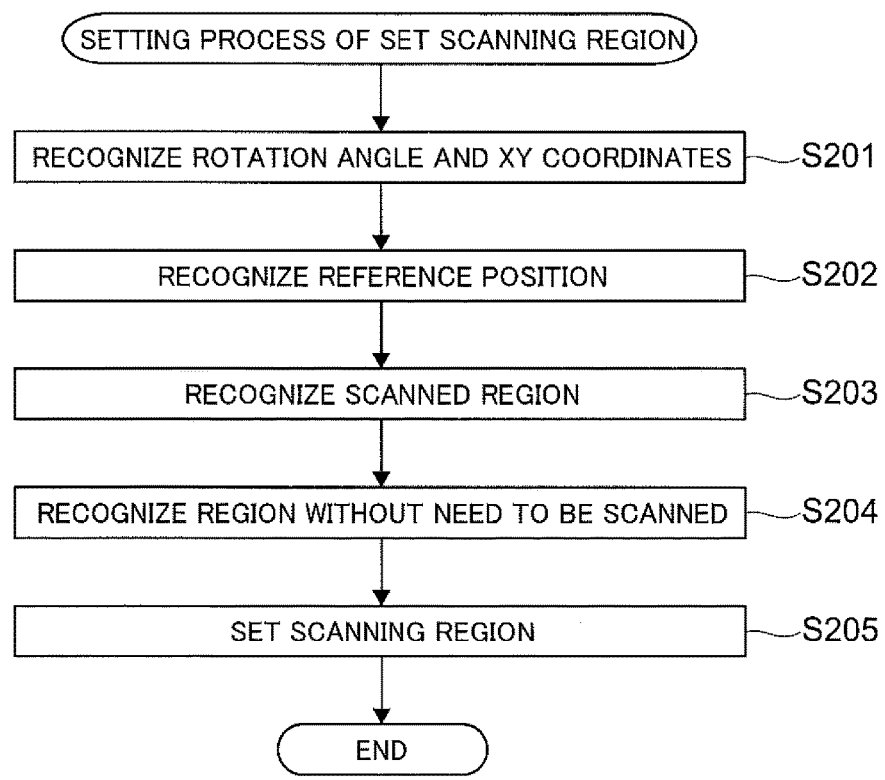
FIG. 10 is a flowchart showing details of the process in step 103.

FIG. 10 is a flowchart showing details of the process in step 103 (the setting process of the set scanning region).

In the setting process of the set scanning region, first, the setting section 62 analyzes the code image detected by the scanning that has already been performed to recognize the rotation angle of the read image, and moreover, recognizes coordinates (XY coordinates) of each pixel constituting the read image (step 201). Next, the setting section 62 recognizes the reference position of the read image based on the recognized rotation angle (step 202).

Next, the setting section 62 recognizes the scanned region, which is the region where the scanning has already been completed (step 203), to thereby recognize a region without need to be scanned where the scanning may not be performed (step 204).

Next, as described above, the setting section 62 sets the side of the unscanned region closer to the reference position as the scanning region; however, if there is any region without need to be scanned (the scanned region), the setting section 62 sets the region, from which the region without need to be scanned is eliminated, as the scanning region (step 205).

Figure 11:
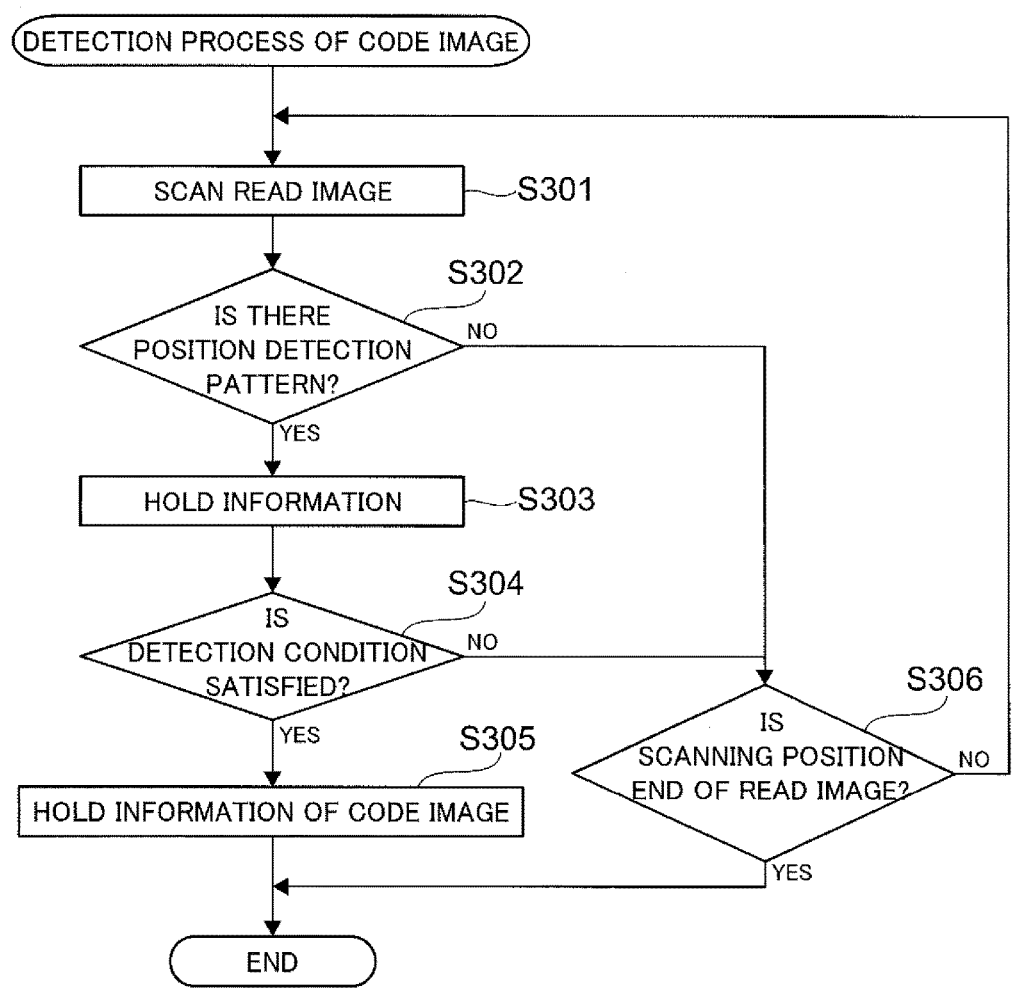
FIG. 11 is a flowchart showing a flow of a detection process of the code image performed in step 101.

FIG. 11 is a flowchart showing a flow of the detection process of the code image performed in step 101 of FIG. 9.

In the detection process of the code image, first, the scanner 61 performs scanning of the read image (step 301); the scanner 61 determines whether or not a position detection pattern exists in the course of sequentially performing the scanning (step 302), and if there is any position detection pattern, it is determined that a part of the code image is detected, and information about the code image (information such as positional information) is held (step 303).

Then, the scanner 61 further pursues the scanning, and based on the above information having been held and a new scanning result obtained by performing the further scanning, sequentially determines whether or not the detection condition of the code image is satisfied (step 304). Then, if the detection condition of the code image, such as detection of three position detection patterns, is satisfied, it is determined that the code image is detected, and the process is completed after the information about the code image (the positional information and the like) is held (step 305).

On the other hand, if it is determined that any position detection pattern is not found in step 302 or if it is determined that the detection condition of the code image is not satisfied in step 304, it is determined whether or not the scanning position is an end of the read image (an end of the scanning region) (step 306).

Then, if it is determined that the scanning position is not the end, the processes of the step 301 and subsequent steps are performed again, and if it is determined that the scanning position is the end, the processes are terminated.

Figure 12:
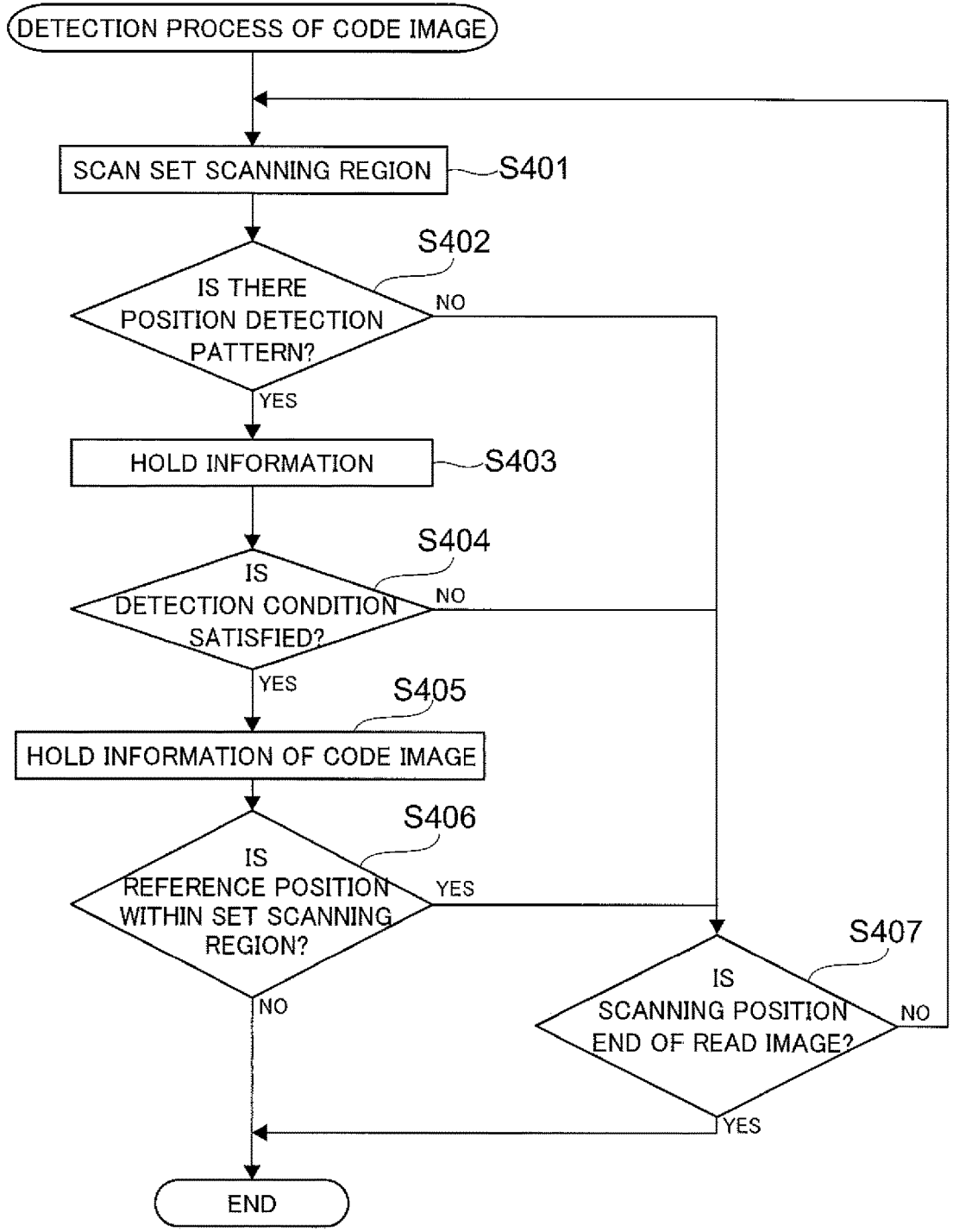
FIG. 12 is a flowchart showing a flow of a detection process of the code image performed in step 104.

FIG. 12 is a flowchart showing a flow of the detection process of the code image (the detection process of the code image performed during the scanning of the set scanning region) performed in step 104 of FIG. 9.

In this process, the scanner 61 performs scanning of the set scanning region (step 401); the scanner 61 determines whether or not a position detection pattern exists in the course of sequentially performing the scanning (step 402), and if there is any position detection pattern, it is determined that a part of the code image is detected, and information about the code image (information such as positional information) is held (step 403).

Thereafter, the scanner 61 further pursues the scanning, and based on the above information having been held and a new scanning result obtained by performing the further scanning, sequentially determines whether or not the detection condition of the code image is satisfied (step 404). Then, if the detection condition of the code image, such as detection of three position detection patterns, is satisfied, the scanner 61 holds the information about the code image (the positional information and the like) (step 405).

Next, the scanner 61 determines whether or not the reference position exists within the set scanning region (step 406), and if it is determined that the reference position does not exist within the set scanning region, the process is completed.

On the other hand, if it is determined that any position detection pattern is not found in step 402, if it is determined that the detection condition of the code image is not satisfied in step 404, or if it is determined that the reference position exists within the set scanning region in step 406, it is determined whether or not the scanning position is an end of the read image (an end of the set scanning region) (step 407).

Then, if it is determined that the scanning position is not the end, the processes of the step 401 and subsequent steps are performed again, and if it is determined that the scanning position is the end, the processes are terminated.

Here, the state in which the reference position exists within the set scanning region refers to the position as shown in FIG. 3D, and in this case, the region (the region indicated by a sign 3X in the figure) exists on a side closer to the reference position than the code image within the set scanning region (the code image indicated by the sign 3M). In other words, in the state shown in FIG. 3D, the reference position is positioned on a downstream side of the code image indicated by the sign 3M in the scanning direction, and on the further downstream side of the code image indicated by the sign 3M, the region exists, in which detection of the code image should be performed.

Therefore, in the exemplary embodiment, if it is determined that the reference position exists within the set scanning region in step 406, the process of step 407 is performed, to thereby determine whether or not the scanning position is an end of the read image (an end of the set scanning region). Then, if the scanning position is not the end, the process of step 401 is performed, to thereby perform scanning of the set scanning region further.

In contrast thereto, if the reference position exists on the upstream side of the detected code image in the scanning direction, on the downstream side of the code image, there is no region in which detection of the code image should be performed. In such a case, "No" determination is made in step 406, and thereby the process is terminated.

Figure 13:
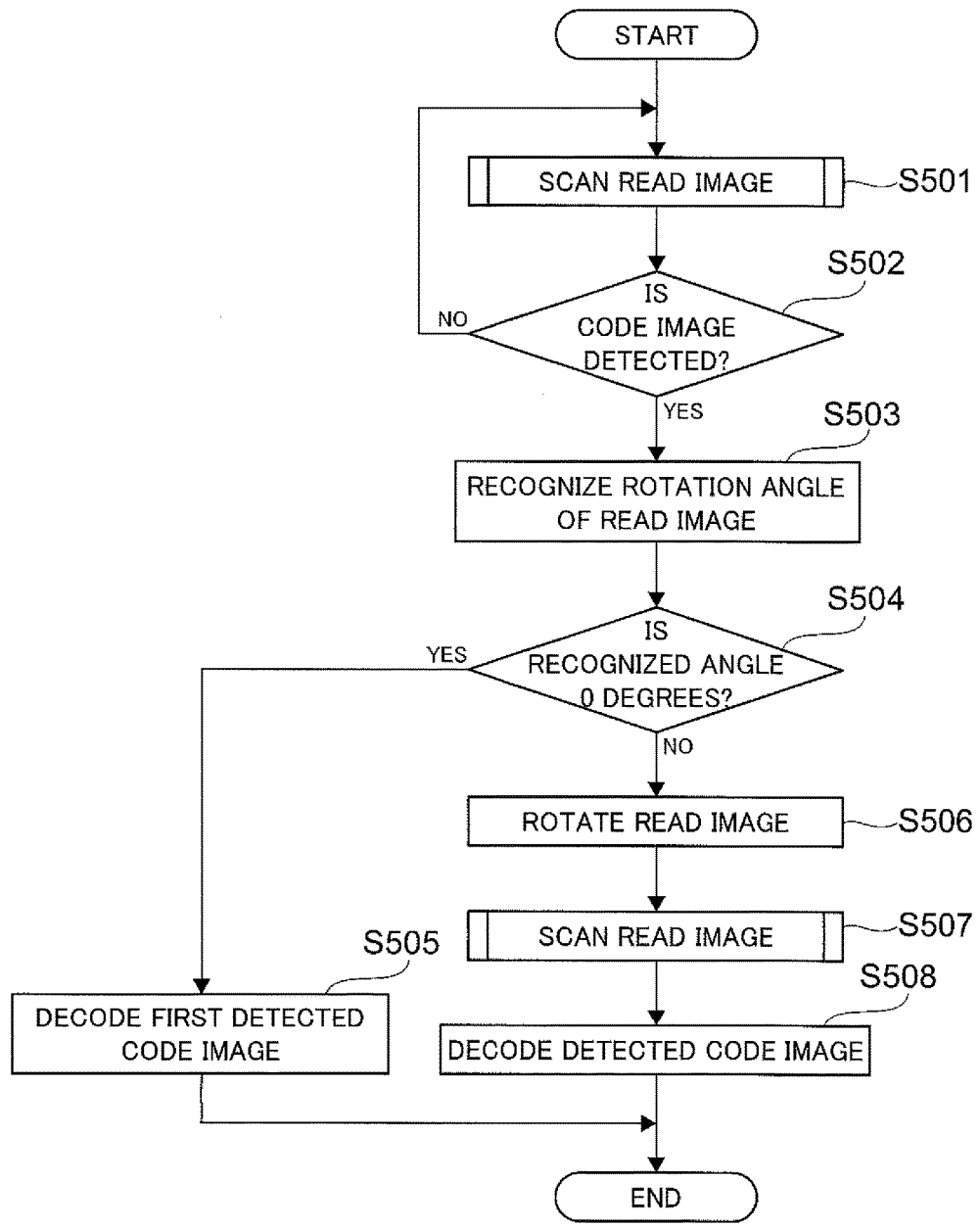
FIG. 13 is a flowchart showing a series of a flow of the processes shown in FIGS. 8A to 8F.

FIG. 13 is a flowchart showing a series of a flow of the processes shown in FIGS. 8A to 8F.

Also in this process, first, the scanner 61 starts scanning of a read image (step 501). Specifically, the scanner 61 starts scanning from a predetermined scanning start position. Then, in the course of sequentially performing the scanning, the scanner 61 determines whether or not a code image is detected (step 502), and, if it is determined that the code image is not detected, the process of step 501 is performed again.

In step 502, if it is determined that the code image is detected, based on the detected code image, the setting section 62 recognizes (calculates) the rotation angle of the read image (step 503).

Specifically, in the exemplary embodiment, as described above, the region of the unscanned region closer to the predetermined reference position is brought close to the scanning start position, and the rotation angle required to bringing the region close to the scanning start position is recognized. Note that, if the scanned region, which is the region where the code image has already been detected, is closer to the reference position than the unscanned region, where the scanning has not been performed yet, the rotation angle is 0°.

Next, it is determined whether or not the rotation angle recognized in step 503 is 0° or not (step 504); if the rotation angle is 0°, the obtaining section 66 performs decoding of the first detected code image (the code image detected from the scanned region) (step 505), to thereby obtain information stored in the code image. Then, based on the obtained information, the above-described predetermined process is executed.

In contrast thereto, if it is determined that the rotation angle is other than 0° in step 504, the image rotation section 65 rotates the read image by the rotation angle recognized in step 503 (step 506). Thereafter, the scanner 61 performs scanning of the read image after the rotating process is performed (step 507).

Then, if the code image is detected by the scanning, the obtaining section 66 performs decoding of the code image (step 508), to thereby obtain information stored in the code image. Then, based on the obtained information, the above-described predetermined process is executed.

Figure 14:
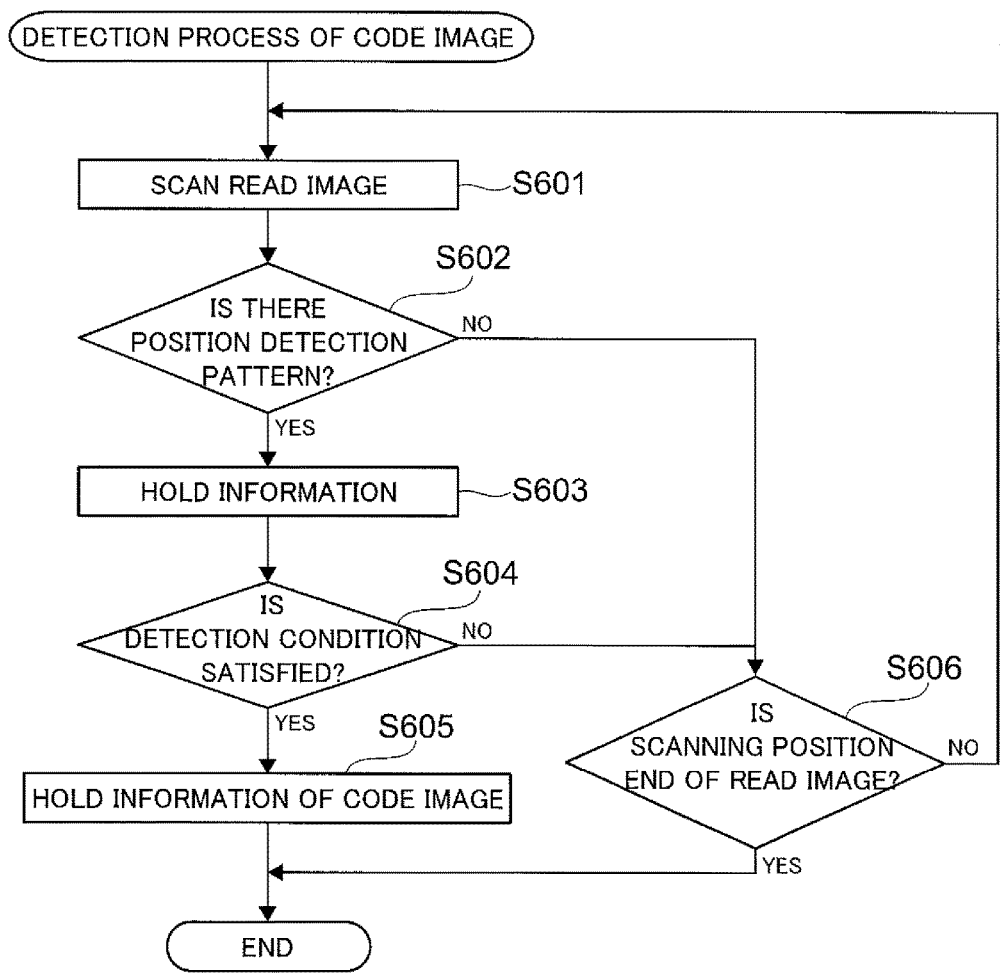
FIG. 14 is a flowchart showing a flow of detection processes of the code image performed in steps 501 and 507.

FIG. 14 is a flowchart showing a flow of the detection process of the code image (the detection process of the code image performed during the scanning of the read image) performed in steps 501 and 507 of FIG. 13.

In the detection process of the code image, similar to the above, the scanner 61 performs scanning of the read image (step 601). Then, the scanner 61 determines whether or not a position detection pattern exists in the course of sequentially performing the scanning (step 602), and if there is any position detection pattern, it is determined that a part of the code image is detected, and information about the code image (information such as positional information) is held (step 603).

Then, the scanner 61 further pursues the scanning, and based on the above information having been held and a new scanning result obtained by performing the further scanning, sequentially determines whether or not the detection condition of the code image is satisfied (step 604). Then, if the detection condition of the code image, such as detection of three position detection patterns, is satisfied, the information about the code image (the positional information and the like) is held (step 605).

On the other hand, if it is determined that any position detection pattern is not found in step 602 or if it is determined that the detection condition of the code image is not satisfied in step 604, the scanner 61 determines whether or not the scanning position is an end of the read image (an end of the scanning region) (step 606), and if the scanning position is determined not to be the end, the process of step 601 and subsequent processes are performed again. On the other hand, if the scanning position is determined to be the end of the read image (the end of the scanning region) in step 606, the process is terminated.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a scanner that performs scanning of an image of a single page of a document and detects a code image included in a scanned region of the image where the scanning is completed; and
a setting unit that sets, based on the code image detected by the scanner, a scanning region within an unscanned region of the image in which scanning by the scanner is to be subsequently performed.

2. The information processing device according to claim 1, wherein
the setting unit recognizes an orientation of the image based on the code image detected by the scanner, and sets the scanning region based on the recognized orientation.

3. The information processing device according to claim 2, wherein
the setting unit recognizes a predetermined reference position in the image based on the recognized orientation, and sets the scanning region based on the recognized predetermined reference position.

4. The information processing device according to claim 3, wherein
the setting unit sets a region, which is a part of the unscanned region and is at least on a side closer to the predetermined reference position within the unscanned region, as the scanning region.

5. The information processing device according to claim 3, wherein the setting unit sets a side, within the unscanned region, closer to the predetermined reference position than the code image detected by the scanner as the scanning region.

6. The information processing device according to claim 3, wherein the scanner performs scanning of the scanning region set by the setting unit, and, if another code image is included in the set scanning region, detects the other code image, and the information processing device further comprises an obtaining unit that obtains information included in any one of the code image detected from the scanned region and the other code image detected from the set scanning region, the one being closer to the predetermined reference position.

7. An information processing device comprising:

a scanner that performs scanning of an image of a single page of a document from a predetermined scanning start position and detects a code image included in a scanned region where the scanning is completed; and a rotation unit that rotates the image based on the code image detected by the scanner such that a region closer to a predetermined reference position within an unscanned region of the image is rotated to be on a side closer to the predetermined scanning start position, wherein scanning by the scanner is to be subsequently performed in the region within the unscanned region.

8. An image reading apparatus comprising:

an image reader capable of reading a document provided with a code image; and an information processing device that performs processing on a read image obtained by the image reader, wherein the information processing device is configured with the information processing device according to claim 1, such that the image of the single page of the document is the read image obtained by the image reader.

9. An image reading apparatus comprising:

an image reader capable of reading a document provided with a code image; and an information processing device that performs processing on a read image obtained by the image reader, wherein the information processing device is configured with the information processing device according to claim 7, such that the image of the single page of the document is the read image obtained by the image reader.

10. A non-transitory computer readable medium storing a program that causes a computer to execute functions, the functions comprising:

performing scanning of an image of a single page of a document and detecting a code image included in a scanned region where the scanning is completed; and based on the detected code image, setting a scanning region within an unscanned region of the image in which scanning is to be subsequently performed.

* * * * *